United States Patent [19]

Tamura et al.

[11] Patent Number: 5,096,401
[45] Date of Patent: Mar. 17, 1992

[54] APPARATUS FOR PRODUCING A SUBSTRATE SHEET FOR OPTICAL RECORDING MEDIA

[75] Inventors: Miki Tamura; Tsuyoshi Santoh; Masataka Yashima, all of Yokohama, Japan

[73] Assignee: Canon Kabushiki Kaisha, Japan

[21] Appl. No.: 542,936

[22] Filed: Jun. 25, 1990

[30] Foreign Application Priority Data

Jun. 26, 1989 [JP] Japan ............... 1-160645
Jun. 30, 1989 [JP] Japan ............... 1-166941

[51] Int. Cl.⁵ .................. B29D 11/00; B29D 17/50
[52] U.S. Cl. ......................... 425/115; 425/130; 425/174.4; 425/230; 425/810; 264/1.4; 264/106; 156/272.2
[58] Field of Search ............ 264/1.4, 106, 22; 425/94, 104, 105, 106, 174.4, 810, 385, 230, 231, 130, 115; 118/620, 641, 419, 407, 244, 70, 652; 156/209, 272.8

[56] References Cited

U.S. PATENT DOCUMENTS

| | | | |
|---|---|---|---|
| 3,579,735 | 5/1971 | Metz | 425/230 |
| 4,000,963 | 1/1977 | Thettu | 118/70 |
| 4,294,782 | 10/1981 | Froehlig | 264/1.4 |
| 4,393,804 | 7/1983 | Nygard et al. | 118/70 |
| 4,790,893 | 12/1988 | Watkins | 264/1.3 |
| 4,829,931 | 5/1989 | Mogi | 118/70 |
| 4,836,874 | 6/1989 | Foster | 264/106 |
| 4,933,215 | 6/1990 | Naruse et al. | 118/70 |
| 4,963,081 | 10/1990 | Yokoya | 118/70 |

FOREIGN PATENT DOCUMENTS 0288580 11/1988 European Pat. Off.

*Primary Examiner*—Jay H. Woo
*Assistant Examiner*—Khanh P. Nguyen
*Attorney, Agent, or Firm*—Fitzpatrick, Cella, Harper & Scinto

[57] ABSTRACT

An apparatus for producing a substrate sheet for optical recording media includes a device for continuously forming an ultraviolet-curable resin layer on at least one of i) a roll stamper having thereon a preformat pattern corresponding with preformatting information and ii) a substrate sheet; a means for bringing the substrate sheet into close contact with the roll stamper having the ultraviolet-curable resin layer; a device for curing said ultraviolet-curable resin layer to fix it on the substrate sheet; a device for peeling from the roll stamper the substrate sheet having the cured ultraviolet-curable resin layer; and a device for removing an ultraviolet-curable resin remaining on the surface of said roll stamper, provided after the means for peeling the substrate sheet.

15 Claims, 4 Drawing Sheets

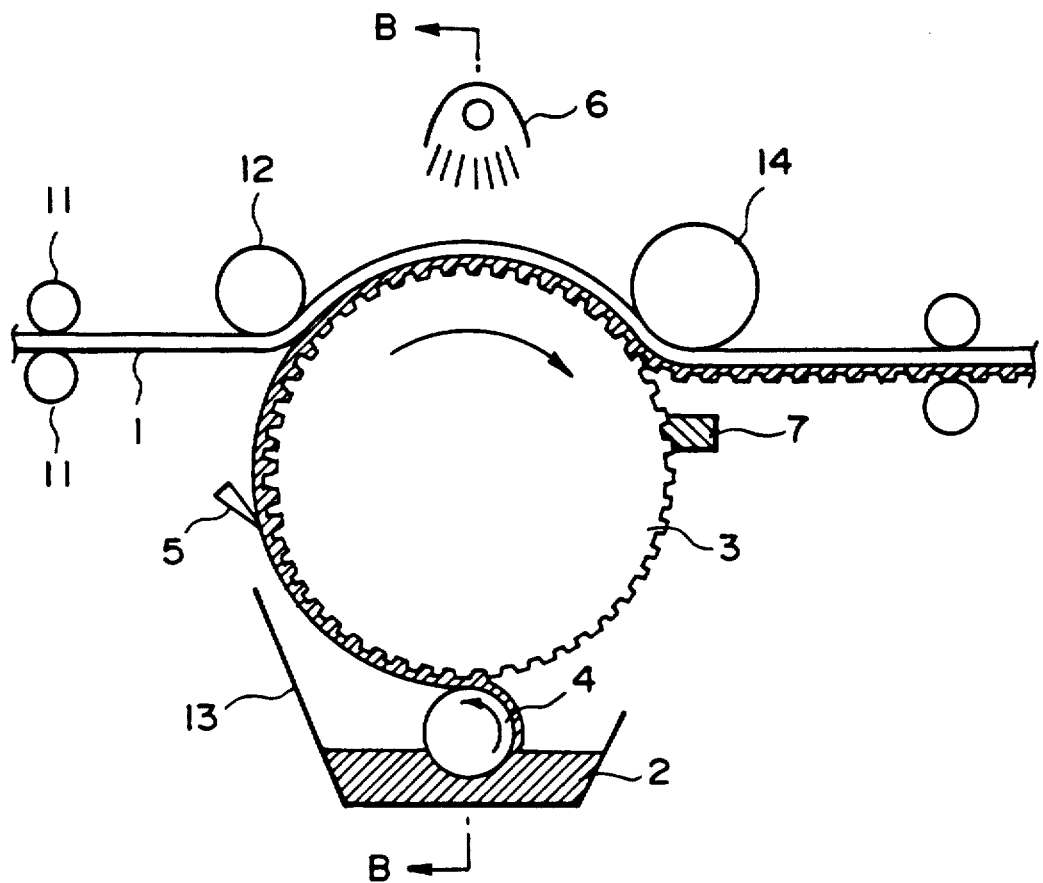
F I G. 1
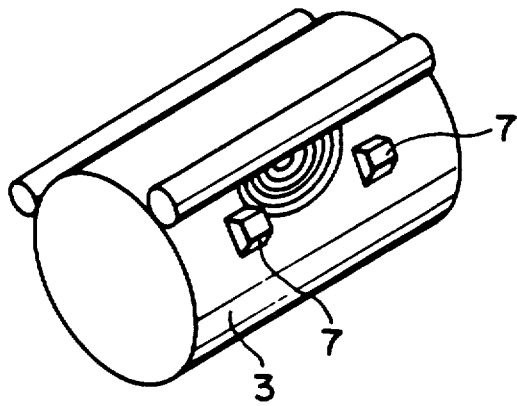
F I G. 2

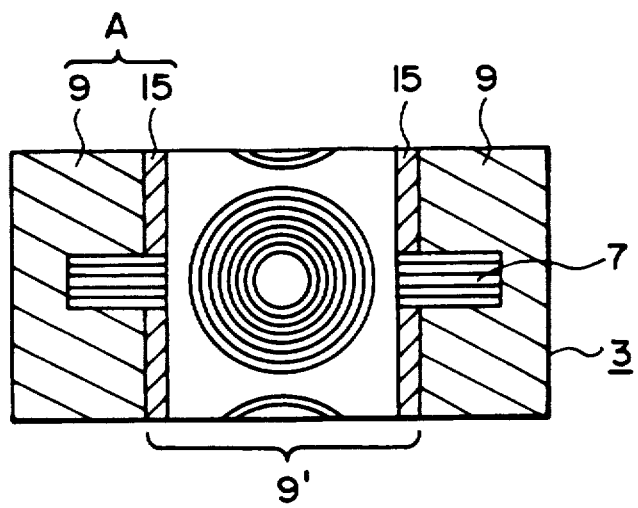
F I G. 3
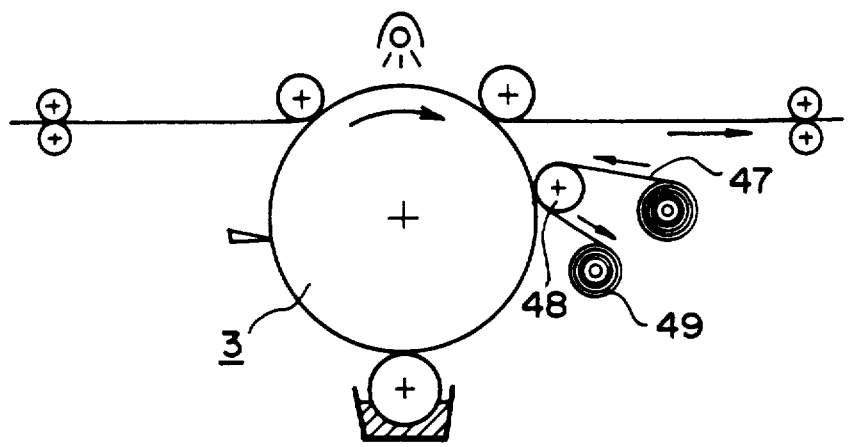
F I G. 4
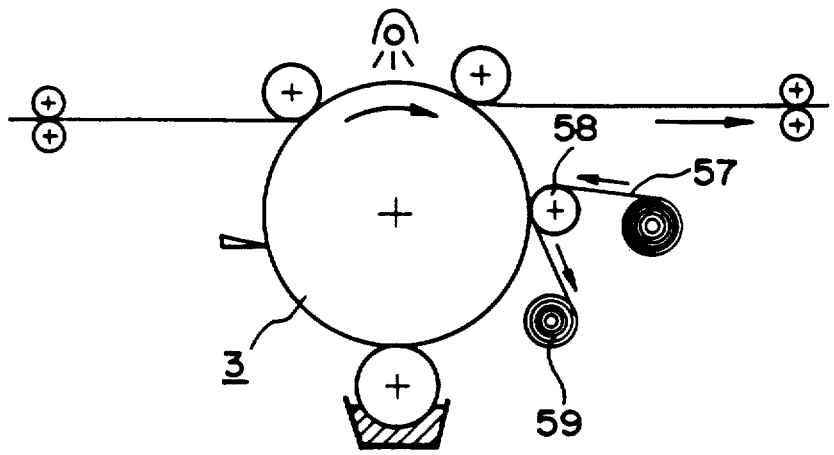
F I G. 5

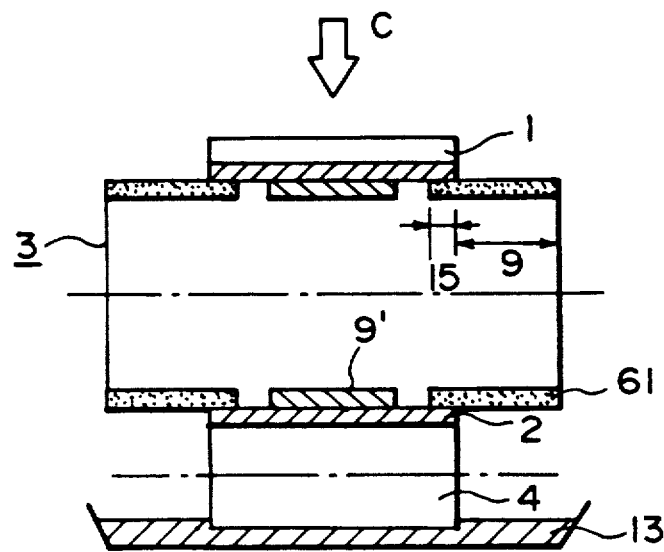
F I G. 6
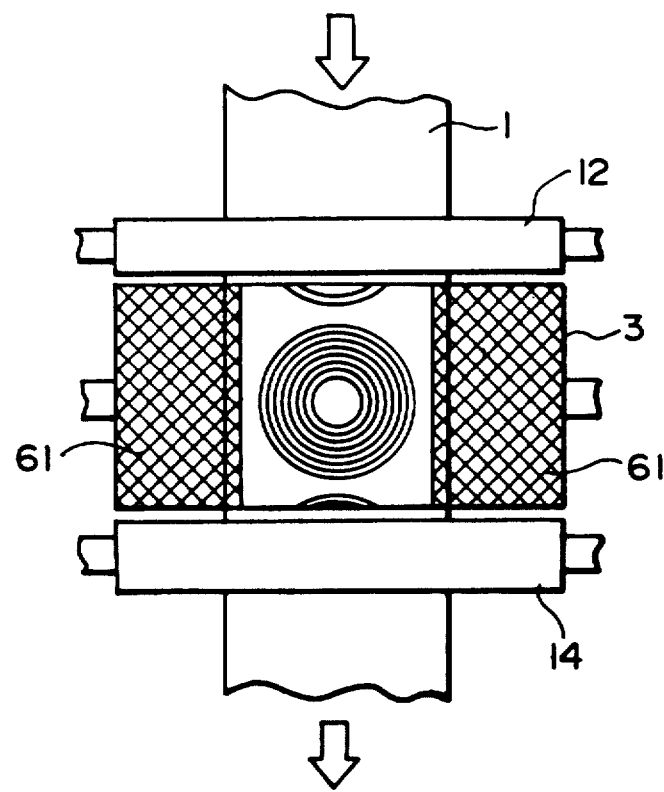
F I G. 7

APPARATUS FOR PRODUCING A SUBSTRATE SHEET FOR OPTICAL RECORDING MEDIA

BACKGROUND OF THE INVENTION

1. Field of the Invention

The present invention relates to an apparatus for continuously producing a substrate sheet for optical recording media used in optically recording and reproducing information using a laser beam or the like. It also relates to a process for producing a substrate sheet for optical recording media making use of the apparatus.

2. Related Background Art

In optical recording/media such as optical disks and optical cards, optically detectable minute pits of several μm in diameter are commonly formed in the form of a track on a thin recording layer provided on a substrate, and thus information can be recorded at a high density. In such optical recording media, a laser beam must be scanned along the track when the information is recorded and reproduced. For this purpose, a substrate with guide grooves for tracking is commonly used.

Methods of preparing such guide grooves or a substrate provided with guide grooves are known to include a compression molding process in which a softened plastic material is pressed using a stamper followed by curing, an injection molding process in which a molten plastic material is injected into a mold provided with a stamper followed by curing, and a 2P photopolymerization) process in which guide grooves are transferred from a stamper by the use of a photopolymer. Of these, the 2P process is one of the superior processes for preparing substrates in view of the advantages that guide grooves can be readily transferred, substrates have a good solvent resistance, and substrates can be made to have less optical distortion.

More specifically, the superior solvent resistance of a substrate is advantageous when a recording layer is formed by coating, using an organic material as a recording material. For example, when a substrate is prepared by the 2P process, it is possible to use a solvent that can not be used in a substrate comprised of the usual plastics such as acrylate and polycarbonate because of its power to dissolve the surface of the substrate. Hence, it becomes possible to use a recording material having a good solubility with respect to the solvent, so that the recording material can be selected from a vast range of materials. The 2P process also has a great advantage in that it requires only a very small investment in equipment, compared with other processes.

Compared with other processes, however, the 2P process requires a longer production time per sheet of substrates, and is not suited for mass-production. Under such circumstances, a proposal, as disclosed in PCT Translation Publication No. 62-506504, has been made about a technique by which, using a master on which patterns of pits or grooves have been formed, the patterns are transferred end formed on a film substrate so that substrates for film-like optical recording media can be continuously produced.

A conventional method for producing substrates for optical recording media will be described below with reference to the accompanying drawings. FIG. 8A illustrates the structure of an apparatus used in forming guide grooves on a substrate according to a conventional method. FIG. 8B is a partial illustration of a roll stamper shown in FIG. 8A, viewed from the side on which an ultraviolet lamp 6 is provided. In these drawings, a substrate sheet 1 fed from feed roll 11 is delivered along the circumference of a roll stamper 3 on which guide grooves or preformat patterns corresponding with information are formed. A nip roll 12 has the function of pressing the substrate sheet 1 against the surface of the roll stamper 3. A resin tank 13 containing a liquid ultraviolet-curable resin, curable as a result of exposure to ultraviolet rays, is provided beneath the roll stamper 3. In this resin tank 13, a coating roll 4 is provided which rotates in pressure contact with the roll stamper 3. The liquid ultraviolet-curable resin 2 is coated by this coating roll 4 on the surface of the roll stamper. The ultraviolet-curable resin 2 thus coated is held between the substrate sheet 1 and the roll stamper 3 by the action of the nip roll 12. An ultraviolet lamp 6 is provided above the nip roll 12, and the ultraviolet-curable resin 2 held between the substrate sheet 1 and the roll stamper 3 is irradiated with ultraviolet rays so that the ultraviolet-curable resin is cured. A delivery roll 14 has the function of peeling from the roll stamper 3 the substrate sheet 1 and the layer of the ultraviolet-curable resin having been cured in a fixed state to the substrate sheet. Thus, preformat patterns of optical disks are transferred to the substrate sheet.

Here, as commonly inherent in ultraviolet-curable resins, the ultraviolet-curable resin exhibits flow behavior before it cures, and ultraviolet-curable resins usually used cure as the reaction proceeds according to radical polymerization, where they are inhibited from curing because of the presence of oxygen in the air.

For this reason, in the above method of producing substrates, a side edge 15, as shown in FIG. 8B, of the ultraviolet-curable resin layer held between the substrate sheet and the roll stamper is inhibited from curing because of the oxygen in he air even after irradiation with ultraviolet rays. resulting in insufficient curing of the ultraviolet-curable resin at that part. Hence, the ultraviolet-curable resin at the side edge exhibits flow behavior, and it often occurs that uncured ultraviolet-curable resin protrudes from an edge of the substrate sheet 1 or the resin at the side edge is not fixed to the substrate sheet 1 even if the coating roll 4 for the ultraviolet-curable resin is made to have a smaller width than the width of the substrate sheet 1. Such uncured or semi-cured ultraviolet-curable resin remains on and adheres to the surface of the roll stamper after the substrate sheet is peeled from the roll stamper. The ultraviolet-curable resin thus adhering to the stamper is cured and built up as a result of irradiation with light while the molding operation is repeated. The ultraviolet-curable resin thus cured and built up is caught on the coating roll 4 or a blade 5 and comes off as scraps, which adhere to the substrate sheet and are included into it. This has been one of the causes of recording and reproducing errors on recording mediums.

SUMMARY OF THE INVENTION

The present invention was made in view of the above problems. Accordingly, an object of the present invention is to provide an apparatus for producing a substrate sheet for optical recording media, that can continuously produce a substrate sheet without exchanging a roll stamper, free from adhesion or the inclusion of scraps, and causing less trouble than heretofore has been possible.

Another object of the present invention is to provide a process for producing a substrate sheet for optical recording media, that can continuously produce a substrate sheet free from adhesion or the inclusion of scraps.

According to an aspect of the present invention, there is provided an apparatus producing a substrate sheet for optical recording media comprising;

- means for continuously forming an ultraviolet-curable resin layer on at least one of i) a roll stamper having thereon a preformat pattern corresponding with preformatting information and ii) a substrate sheet;
- means for bringing the substrate sheet into close contact with the roll stamper having the ultraviolet-curable resin layer;
- means for curing the ultraviolet-curable resin layer to fix it on the substrate sheet;
- means for peeling from the roll stamper the substrate sheet having the cured ultraviolet-curable resin layer; and
- means for removing an ultraviolet-curable resin remaining on the surface of the said roll stamper, provided after the means for peeling the substrate sheet.

According to another aspect of the present invention, there is provided a process for producing a substrate sheet for optical recording media comprising the;

- forming an ultraviolet-curable resin layer on at least one of i) a roll stamper having thereon a preformat pattern corresponding with preformatting information and ii) a substrate sheet;
- bringing the substrate sheet into close contact with the roll stamper having said ultraviolet-curable resin layer;
- curing the ultraviolet-curable resin layer by irradiating said ultraviolet-curable resin layer with an ultraviolet ray;
- peeling from the roll stamper the substrate sheet having a cured ultraviolet-curable resin layer; and
- removing an ultraviolet-curable resin adhering to the surface of said roll stamper, after peeling the cured ultraviolet-curable resin layer.

The process of the present invention for continuously producing a substrate sheet for optical recording media, in which a preformat pattern corresponding with preformatting information as exemplified by guide grooves or information is transferred to and formed on a substrate sheet using an ultraviolet-curable resin by means of a roll stamper having the pattern, has continuous steps of peeling the substrate sheet from the stamper so that the pattern of the stamper is transferred to the ultraviolet-curable resin fed on the substrate sheet, and thereafter removing, e.g., by wiping, the ultraviolet-curable resin that remains on and adheres to the surface of the roll stamper after peeling. Thus it is possible to keep clean the surface of the roll stamper, and to continuously produce, with good productivity without changing the roll stamper, the substrates for optical recording media free of adhesion or the inclusion of scraps.

BRIEF DESCRIPTION OF THE DRAWINGS

FIG. 1 illustrates an example of the preferred embodiments of the process of the present invention for producing a substrate sheet for optical recording media.

FIG. 2 is a perspective view to show a roll stamper 3 and a wiping member 7 shown in FIG. 1.

FIG. 3 is a front view to show the positional relationship between the roll stamper and wiping member shown in FIG. 1.

FIGS. 4 and 5 each illustrate another example of the preferred embodiments of the present invention.

FIG. 6 is a cross section along the line B-B of the apparatus for producing a substrate sheet for optical recording media, shown in FIG. 1, in which the roll stamper is provided with a release layer.

FIG. 7 is a plan view of the stamper shown in FIG. 6, viewed from the direction C.

DESCRIPTION OF THE PREFERRED EMBODIMENTS

Figure 8A:
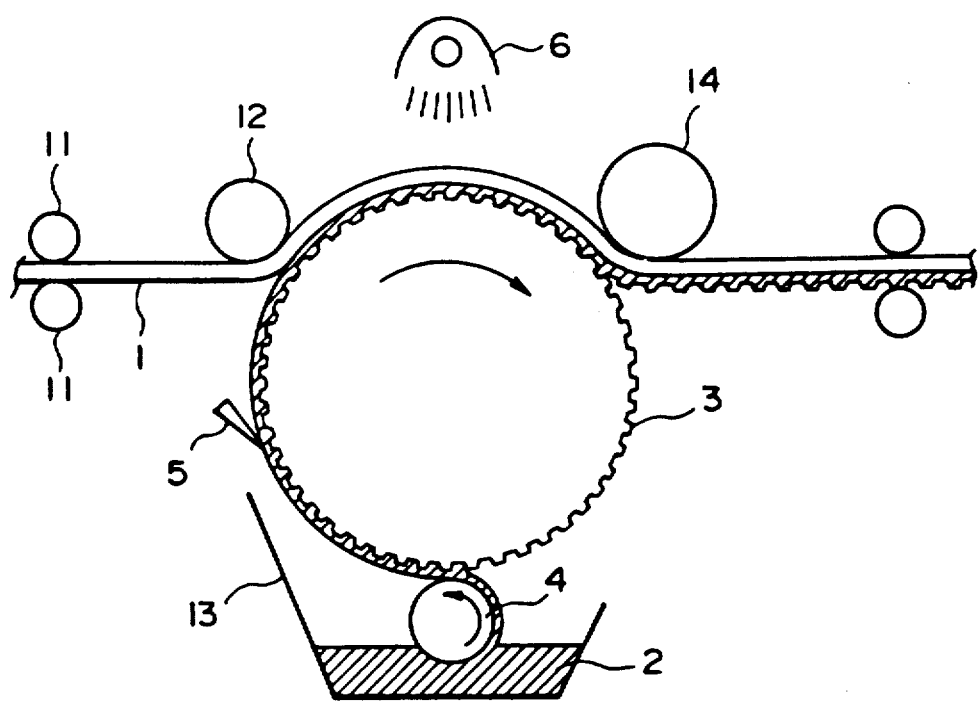
FIG. 8A illustrates the structure of an apparatus used in forming guide grooves on a substrate according to a conventional method.
Figure 8B:
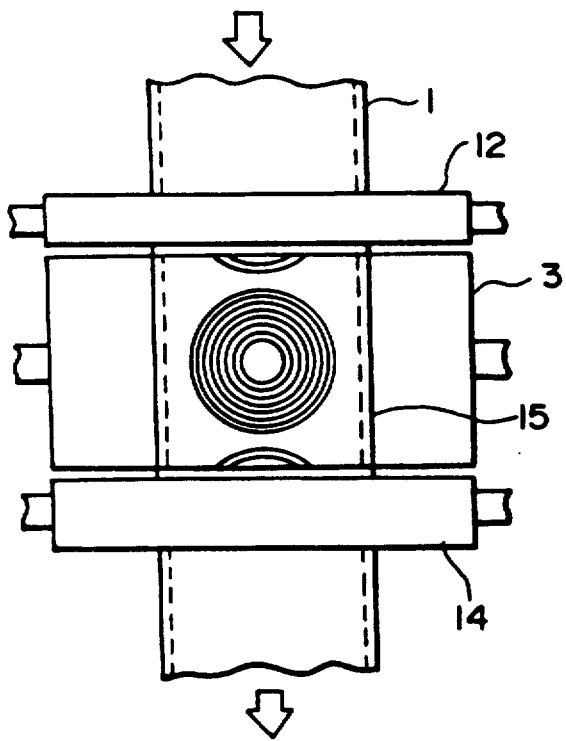
FIG. 8B is partial illustration of a roll stamper shown in FIG. 8A.

The present invention will be described below in detail with reference to the drawings.

FIG. 1 illustrates an example of the apparatus of the present invention, used in continuously producing a substrate sheet for optical recording media.

FIG. 2 is a perspective view to show a roll stamper 3 and a wiping member 7 shown in FIG. 1.

In the present embodiment, the ultraviolet-curable resin having remained on the roll stamper is removed by wiping it. The apparatus shown in FIG. 1 will be described below in the order of the production steps.

The roll stamper 3 has on its surface a plurality of fine preformat patterns corresponding with the preformatting information of optical recording media. A resin tank 13 holding therein a liquid ultraviolet-curable resin 2 capable of curing as a result of irradiation with ultraviolet rays is provided below the roll stamper 3. In this resin tank 13, a coating roll 4 that rotates in pressure contact with the surface of the roll stamper 3 is provided so that the ultraviolet-curable resin 2 in a liquid state is applied to the surface of the roll stamper 3. A resin layer 2' thus formed by coating is regulated with a blade 5 to have a uniform thickness, and then held between a substrate sheet 1 and the roll stamper 3 by means of a nip roll 12. The ultraviolet-curable resin layer 2' formed by coating on the surface of the roll stamper 3 may preferably be in a thickness of from 0.1 $\mu$m to 50 $\mu$m, and particularly from 5 $\mu$m to 25 $\mu$m. in order for the ultraviolet-curable resin layer to not include bubbles and for the preformat patterns to be ell transferred.

On the other hand the substrate sheet 1, which is, is continuously fed from a feed roll 11. The substrate sheet may preferably be delivered at a rate of from 0.05 to 5 m/min, and particularly from 0.05 to 2.5 m/min, taking account of enhancing the productivity of substrate sheets for optical recording media, and also preventing bubbles from being included between the substrate sheet 1 and the resin layer 2' when the sheet is brought into contact with the resin layer 2'.

The substrate sheet 1 thus delivered forward passes the nip roll 12 and is thereafter so set as to hold the ultraviolet-curable resin layer 2' between it and the roll stamper 3. Next, the ultraviolet-curable resin layer held between the substrate sheet 1 and the roll stamper 3 is irradiated with ultraviolet rays by means of an ultraviolet lamp 6 provided above the roll stamper 3. The ultraviolet-curable resin layer 2' is thus cured. The cured ultraviolet-curable resin layer 2' is then peeled from the roll stamper 3. In this way, a substrate sheet for optical recording media can be obtained on which the preformat patterns of stampers have been transferred to the cured ultraviolet-curable resin layer 2' formed on the substrate sheet. The ultraviolet-curable resin 2 remaining on the roll stamper 3 after the cured ultraviolet-curable resin layer 2' has been peeled is wiped off using a wiping member 7.

There are no particular limitations on the substrate sheet 1 used in the present invention, so long as it is transparent to wavelengths of the ultraviolet and/or reproducing, and is flexible. For example, it is possible to use substrates made of plastics such as polycarbonate, polymethyl methacrylate, polyesters, epoxy resins, and polyolefins.

In the present invention, a usual ultraviolet-curable resin comprising a photopolymerizable prepolymer having an unsaturated bond in the molecule, a photopolymerizable monomer and a photopolymerization initiator can be used as the ultraviolet-curable resin 2, including any of those capable of being readily peeled from the stamper in a cured state and also well matched for a recording layer. The photopolymerizable prepolymer that can be used includes, for example, unsaturated polyesters, and acrylates such as epoxy acrylate, urethane acrylate, and polyether acrylate.

The photopolymerizable monomer that can be used includes, for example, monofunctional monomers such as lauryl acrylate, 2-ethylhexyl acrylate, 2-hydroxyethyl acrylate, 1,6-hexanediol monoacrylate, and dichloropentadiene acrylate, and polyfunctional monomers such as 1,3-butanediol diacrylate, 1,6-hexanediol diacrylate, diethylene glycol diacrylate, trimethylolpropane triacrylate, and pentaerythritol triacrylate.

The photopolymerization initiator than can be used includes, for example, benzophenone, benzoin and derivatives thereof, benzoin ether, and benzyldimethylketal.

In the continuous molding according to the present invention, the ultraviolet-curable resin 2 may be applied to the roll stamper 3, or may be applied to the substrate sheet 1 side. It may alternatively be applied to both the roll stamper 3 and the substrate sheet 1. In the case when the ultraviolet-curable resin is applied to both the roll stamper and the substrate sheet, the contact between the roll stamper and the substrate sheet is in a state of liquid-liquid contact, and hence air bubbles can be prevented from being included. A primer may optionally be applied in order to improve the adhesion between the substrate sheet 1 and the ultraviolet-curable resin 2.

The roll stamper 3 can be prepared by a method in which a flat sheet stamper of from 0.1 to 0.3 mm in thickness, having a pattern corresponding to preformatting information, is stuck fast with an adhesive along the roll surface of a mirror-finished roll, a method in which the stamper is secured through a mechanical means such as screws, or a method in which the pattern is directly engraved on a mirror-finished roll.

Materials used for the mirror-finished roll used in the present invention may be metals, semiconductors, dielectrics or alloys. It is particularly preferred to use aluminum, hard metal, mold steel or the like, which can be readily mirror-finished. Chromium steel can be particularly preferably used.

In the preformat pattern formed on the roll stamper, that corresponds with preformatting information, the preformatting information refers to, for example, tracking grooves and/or encoded information in the form of readable marks. It specifically refers to a spiral track groove for an optical disk, having dimensions of, for example, a width of from 0.2 $\mu$m to 3.0 $\mu$m and particularly from 0.5 $\mu$m to 2 $\mu$m, and a pitch of from 0.1 $\mu$m to 15.0 $\mu$m and particularly from 1.0 82 m to 5 $\mu$m; stripe-like track grooves for an optical card, of a width of from 1 $\mu$m to 10 $\mu$m and particularly from 2 $\mu$m to 5 $\mu$m, and an interval of from 5 $\mu$m to 20 $\mu$m and particularly from 8 $\mu$m to 15 $\mu$m; or rectangular minute information pits, of a length of 10 $\mu$m or less and a width of 10 $\mu$m or less, or elliptical minute information pits, of a major axis of 10 $\mu$m or less.

The diameter of the roll stamper 3 may vary depending on the material or thickness of the substrate sheet 1 used. For example, in the case of a substrate sheet of about 0.3 to about 1.5 mm in thickness and made of polycarbonate, the roll stamper 3 may preferably have a diameter of not less than 300 mm, and particularly not less than 350 mm, in order to maintain the adhesion between the roll stamper and the substrate sheet and also preventing the substrate sheet from warping.

The ultraviolet-curable resin 2 held between the substrate sheet 1 and the roll stamper 3 is cured using the ultraviolet lamp 6. Subsequently, the substrate sheet 1 and the ultraviolet-curable resin 2 cured thereon are peeled from the roll stamper 3. A substrate sheet for optical recording media can be thus obtained on which the preformat patterns have been transferred and formed. However, at the side edges of the ultraviolet-curable resin layer 2' held between the substrate sheet 1 and the roll stamper 3, the ultraviolet-curable resin is inhibited from curing because of its contact with the atmosphere, resulting in insufficient curing of the ultraviolet-curable resin at that part. Hence, the ultraviolet-curable resin at the side edge has flow behavior, and the resin tends to adhere to the roll stamper 3, and the uncured or semi-cured ultraviolet-curable resin remains on the surface of the roll stamper after the substrate sheet 1 is peeled from the roll stamper 3.

As a means for removing the ultraviolet-curable resin remaining on the roll stamper 3, the resin is removed by wiping, using a wiping member 7 so provided as to be in contact with the roll stamper 3.

The wiping member 7, as shown in FIG. 3 in which the roll stamper shown in FIG. 2 is viewed from the front of the wiping member, may preferably be so disposed as to be in contact with the parts from, on and to which the ultraviolet-curable resin on the roll stamper 3 tends to protrude, remain and adhere, i.e., the area including both the part at which no ultraviolet-curable resin layer is formed on the surface of the roll stamper 3 (hereinafter this part is called a no resin layer area 9) and the area with which the side edge of the ultraviolet-curable resin layer 2' on the roll stamper 3 comes into contact (i.e., side edge 15). It may also be so disposed as to be also in contact with an area 9' including the area 9 and at which the preformat pattern is provided. The wiping member may not necessarily be in contact with the whole surface of the no resin layer area 9. For example, as shown in FIG. 3, it may be so formed as to be in contact with part of the no resin layer area 9 adjacent to the side edge of the resin layer. In the present invention, the side edge of the resin layer 2' refers to the part at which the inhibition of curing tends to occur at both side edges, and specifically refers to the area of 2 mm to 15 mm wide from each side edge.

Materials used for this wiping member 7 may preferably be soft materials capable of completely removing the ultraviolet-curable resin adhered to the roll stamper and also causing no scratches on the roll stamper. Such materials include polyolefin resins such as polyethylene, polypropylene, and polytetrafluoroethylene, polyester resins, polyamide resins, epoxy resin, polyurethane resins, polyacrylate resins, polyvinyl chloride resins, polystyrene resins, and phenol resins.

Bulky or spongy members of phenolic resins or the like, and also cloths or non-woven fabrics made of these are preferably used.

It is preferred to impregnate the wiping member with a solvent such as acetone, alcohol and toluene, thereby making it possible to readily remove the ultraviolet-curable resin.

The pressure used when the wiping member is brought into contact with the roll stamper is variable depending on the material for the roll stamper and the material for the wiping member. In order to prevent the roll stamper form being scratched and to remove the resin well, the pressure may preferably be in the range of from 0.1 kg/cm$^2$ to 20 kg/cm$^2$, and particularly from 0.5 kg/cm$^2$ to 10 kg/cm$^2$.

An excessively small pressure against the roll stamper may result in incomplete removal of the ultraviolet-curable resin adhering to the roll stamper. On the other hand, an excessively large pressure may cause scratches on the roll stamper or result in rotational non-uniformity of the roll stamper to bring about inaccurate transfer of the patterns.

To the surface of the roll stamper 3 from which the resin remaining on and adhering to the roll stamper has been removed, the ultraviolet-curable resin 2 is newly fed through the coating roll, so that the substrates are continuously formed.

FIG. 4 illustrates another embodiment of the present invention, and shows an example in which a sheet-like wiping member is used as a means for removing the ultraviolet-curable resin remaining on the roll stamper.

A sheet-like wiping member 47 is in contact with the surface of the roll stamper 3 by means of a roll 48 under a pressure of several kg/cm$^2$ or less. It wipes and removes the ultraviolet-curable resin adhering to the surface of the roll stamper 3, and is thereafter wound up on a wind-up roll 49. The wiping member may be impregnated with a solvent such as acetone, alcohol and toluene, so that the resin can be more readily removed.

FIG. 5 illustrates still another embodiment of the present invention. In the present embodiment, the ultraviolet-curable resin remaining on the roll stamper 3 is removed using an adhesive sheet. In FIG. 5, the numeral 57 denotes the adhesive sheet. The adhesive sheet 57 comes into contact with the roll stamper 3 by means of a roll 58, removes the ultraviolet-curable resin adhering to the surface of the roll stamper 3, and is thereafter wound up on a wind-up roll 59.

The resin adhering to the roll stamper 3 may previously be swelled with a solvent or the like before the adhesive sheet is used, so that the resin can be more readily removed.

In the present invention, as shown in FIG. 6, a release layer 61 to which the ultraviolet-curable resin 2 can be fixed with difficulty may further be provided at the areas 9 and 15 of the roll stamper at which the ultraviolet-curable resin 2 tends to be adhered. In such an instance, the resin adhering to the roll stamper can be more readily removed.

This release layer 61 may preferably be comprised of a material having an oil repellency. In particular, silicone resins or fluorine resins can be preferably used.

The silicone resins include, for example, oils, resins or cross-linked products of silicone, such as dimethyl silicone, methyl phenyl silicone, methyl hydrogensilicone, polydiorganosiloxanediol, chlorophenylsilicone, fluorosilicone, a silicone polyether copolymer, an alkyl-modified silicone, a higher fatty acid modified silicone, an amino-modified silicone, and an epoxy-modified silicone, all of which can be used. Mixtures of any of these can also be all used.

The fluorine resins include resins containing a fluoroolefin as a base unit, such as polyethylene tetrafluoride, an ethylene tetrafluoride/propylene hexafluoride copolymer, an ethylene tetrafluoride/perfluoroalkyl vinyl ether copolymer, an ethylene tetrafluoride/ethylene copolymer, polyethylene trifluorochloride, polyvinylidene fluoride, polyvinyl fluoride, and an ethylene trilfluorochloride/ ethylene copolymer. Mixtures of these can also be used.

The coating thickness of the release layer 61 influences the thickness of the ultraviolet-curable resin 2 brought into close contact with the substrate 1, and hence may be not more than 50 $\mu$m, preferably be in the range of from 0.01 to 10 $\mu$m, and particularly preferably from 0.1 to 5 $\mu$m.

The formation o the release layer enables effective removal of the ultraviolet-curable resin adhering to the roll stamper, even when the pressure of the wiping member against it is greatly decreased. The pressure of the wiping member against the roll stamper in the case when the release layer is provided may range, for example, from 0.01 kg/cm$^2$ to 20 kg/cm$^2$, and particularly from 0.05 kg/cm$^2$ to 5 kg/cm$^2$.

In the present invention, the uncured ultraviolet-curable resin 2 that protrudes from the side edges of the substrate sheet 1 after it passes the nip roll 12 may also be removed by suction using a vacuum tube (not shown). This makes it possible to lessen the scraps.

As having been described above, the present invention makes it possible to produce a substrate sheet for optical recording media that is free from defects and enables prevention of adhesion and inclusion of scraps into substrates when substrates having fine preformat patterns corresponding with preformatting information are continuously formed using a roll stamper.

EXAMPLES

The present invention will be described below in greater detail by in the following Examples.

EXAMPLE 1

A photoresist (trade name: AZ-1300; a product of Hoechst Ltd.) film was formed on a glass master to have a coating thickness of 1,000 Å, followed by exposure using a laser beam cutting device and then developing to form a preformat pattern. Next, on the pattern thus formed, an Ni thin film was formed by sputtering so that its surface was made conductive, and thereafter an Ni deposit of 0.1 mm in thickness was formed by electroforming. Next, the Ni deposit was peeled from the lass master. Flat sheet stampers made of Ni, used for 3.5 inch optical disks were thus obtained, each having a preformat pattern corresponding with track grooves of a spiral form of 0.6 $\mu$m in groove width, 1.6 $\mu$m in pitch and 900 Å in groove depth.

Using an epoxy adhesive (trade name: EP-170; a product of Cemedine Co., Ltd.), 12 pieces of the flat sheet stampers made of Ni, thus obtained, were stuck fast in a row on the external surface of a mirror-finished roll of 400 mm in outer diameter and 150 mm in width, made of chromium steel. A roll stamper was thus prepared.

Using the resulting roll stamper, an apparatus for producing a substrate sheet for optical disks, as shown in FIG. 1, was made up. Wiping members were so disposed as to be in contact with the areas of 7 mm from both side edges of the roll stamper. The wiping members used were made of a material comprising polyester sponge (trade name: Miraclepuff; a product of Toray Industries Inc.) impregnated with isopropyl alcohol, and were brought into pressure contact with the roll stamper at a pressure of 7 kg/cm$^2$.

A polycarbonate substrate sheet of 1.2 mm in thickness and 140 mm in width was used as the substrate sheet. An ultraviolet-curable resin of an epoxy acrylate type (MRA-5000, a product of Mitsubishi Rayon Co., Ltd. was applied to the pattern surface of the roll stamper to give a thickness of 25 μm and a width of 140 mm. The substrate sheet was fed at a speed of 2 m/min. The substrate sheet was brought into close contact with the roll stamper by means of the nip roll. Thereafter, the ultraviolet-curable resin layer thereby spread out was irradiated with ultraviolet rays (a 4 KW high-pressure mercury lamp, 300 mW/cm$^2$) for 15 seconds over the whole surface of the substrate sheet, and he ultraviolet-curable resin layer was thus cured.

Next, the substrate sheet and the ultraviolet-curable resin layer cured thereon were peeled from the roll stamper. Thus, a flash-free substrate sheet for optical disks having track grooves of a spiral form of 0.6 μm in groove width, 1.6 μm in pitch and 900 Å in groove depth was obtained. This procedure was repeated so that substrates for 500 sheets of optical disks were molded, but it was confirmed by visual examination that no ultraviolet-curable resin remained on the roll stamper. No scratches were also seen on the roll stamper.

EXAMPLE 2

A roll stamper was prepared in the same manner as in Example 1.

The resulting roll stamper was coated at both side edges thereof in a width of 20 mm each, with an isopropyl alcohol solution in which 97 parts by weight of a solution type silicone (YRS 3022, a product of Toshiba Silicone Co., Ltd.) and 3 parts by weight of a catalyst (YC 6831, a product of Toshiba Silicone Co., Ltd.) were dissolved, followed by heat curing at 60° C. for 10 minutes. Release layers of 0.2 μm each in coating thickness were thus formed.

Wiping members, comprised of the same member as in Example 1, were put into contact with the roll stamper at a pressure of a half of that in Example 1, i.e., 3.5 kg/cm$^2$.

A polycarbonate substrate sheet of 1.2 mm in thickness and 140 mm in width was used as the substrate sheet. An ultraviolet-curable resin of an epoxy acrylate type (MRA-5000, a product of Mitsubishi Rayon Co., Ltd.) was applied to the pattern surface of the roll stamper to give a thickness of 25 μm. The substrate sheet was fed at a speed of 2 m/min. The substrate sheet was brought into close contact with roll stamper by means of the nip roll. Thereafter, the ultraviolet-curable resin layer thereby spread out was irradiated with ultraviolet rays (a 4 KW high-pressure mercury lamp, 300 mW/cm$^2$), and the ultraviolet-curable resin layer was thus cured.

Next, the substrate sheet and the ultraviolet-curable resin layer cured thereon were peeled from the roll stamper. Thus, a flash-free substrate sheet having a groove preformat pattern of 0.6 μm in groove Width, 1.6 μm in pitch and 900 Å in groove depth was obtained. This procedure was repeated so that substrates for 500 sheets of optical disks were molded, but no ultraviolet-curable resin remained on the roll stamper.

EXAMPLE 3

In place of the silicone release layers in Example 2, the roll stamper was coated at both side edges thereof in a width of 20 mm each, with an ethanol solution in which 70 parts by weight of a fluorine resin (Lumiflon LF300, a product of Asahi Glass Co., Ltd.) and 30 parts by weight of tolylene diisocyanate were dissolved, followed by heat curing at 80° C. for 3 hours. Release layers of 0.2 μm each in coating thickness were thus formed.

Next, following the same procedure as in Example 2, a flash-free substrate sheet having a groove preformat pattern of 0.6 μm in groove width, 1.6 μm in pitch and 900 Å in groove depth was obtained. This procedure was repeated so that substrates for 500 sheets of optical disks were molded, but no ultraviolet-curable resin remained on the roll stamper.

EXAMPLE 4

A photoresist (trade name: AZ-1300; a product of Hoechst Japan Ltd.) film was formed on a glass master to have a coating thickness of 1,000 Å followed by exposure using a laser beam cutting device and then developing to form a preformat pattern. Next, on the pattern thus formed, an Ni thin film was formed by sputtering so that its surface was made conductive, and thereafter an Ni deposit of 0.1 mm in thickness was formed by electroforming. Next, The Ni deposit was peeled from the glass master. Flat sheet stampers made of Ni, used for optical cards of 54 mm in length and 85 mm in width were thus obtained, each having a preformat pattern corresponding with 3,000 lines of parallel track grooves of 3 μm in groove width, 12 μm in pitch, 3,000 Å in groove depth and 85 mm in length.

Using an epoxy type adhesive (trade name: EP-170; a product of Cemedine Co., Ltd.), 7 pieces of the flat sheet stampers made of Ni, thus obtained, were stuck fast in a row on the external surface of a mirror-finished roll of 350 mm in outer diameter and 150 mm in width, made of chromium steel, in such a manner that the track groove patterns were parallel in the peripheral direction of the roll and also the center of the roll coincided with the center of the stamper. A roll stamper was thus prepared.

Using the resulting roll stamper, an apparatus for producing a substrate sheet for optical cards, as shown in FIG. 1, was made up. Wiping members were so disposed in this apparatus as to be in contact with the areas of 30 mm from both side edges of the roll stamper. The wiping members used were made of a material comprising polyester-nylon fiber (trade name: Kurauzen MCF; a product of Kanebo, Ltd.) impregnated with isopropyl alcohol, and were brought into pressure contact with the roll stamper at a pressure of 5 kg/cm$^2$.

UNITED STATES PATENT AND TRADEMARK OFFICE
CERTIFICATE OF CORRECTION

PATENT NO. : 5,096,401

DATED : March 17, 1992

INVENTOR(S) : MIKI TAMURA, ET AL.

It is certified that error appears in the above-identified patent and that said Letters Patent is hereby corrected as shown below:

COLUMN 1:
    Line 14, "recording/media" should read --recording media--.
    Line 29, "2p photo-" should read --2p (photo- --.
    Line 59, "end" should read --and--.

COLUMN 2:
    Line 38, "rays." should read --rays,--.
    Line 58, "mediums." should read --media.--.

COLUMN 3:
    Line 23, "said" should be deleted.
    Line 28, "the ." should read --the steps of.--.
    Line 65, "&he" should read --the--.

COLUMN 4:
    Line 15, "is" should read --is a--.
    Line 47, "25$\mu$m." should read --25$\mu$m,--.
    Line 49, "ell" should read --well--.
    Line 51, "hand" should read --hand,--; and "is," should read --is light-transmissive--.

COLUMN 5:
    Line 11, "ultraviolet and/or" should read --ultraviolet rays and the light to be used in optical recording and/or--.
    Line 35, "than" should read --that--.

COLUMN 6:
    Line 6, "82m" should read --$\mu$m--.
    Line 28, "media" should read --medium--.

UNITED STATES PATENT AND TRADEMARK OFFICE
CERTIFICATE OF CORRECTION

PATENT NO. : 5,096,401

DATED : March 17, 1992

INVENTOR(S) : MIKI TAMURA, ET AL.

It is certified that error appears in the above-identified patent and that said Letters Patent is hereby corrected as shown below:

COLUMN 1:
    Line 14, "recording/media" should read --recording media--.
    Line 29, "2p photo-" should read --2p (photo- --.
    Line 59, "end" should read --and--.

COLUMN 2:
    Line 38, "rays." should read --rays,--.
    Line 58, "mediums." should read --media.--.

COLUMN 3:
    Line 23, "said" should be deleted.
    Line 28, "the ." should read --the steps of.--.
    Line 65, "&he" should read --the--.

COLUMN 4:
    Line 15, "is" should read --is a--.
    Line 47, "25µm." should read --25µm,--.
    Line 49, "ell" should read --well--.
    Line 51, "hand" should read --hand,--; and "is," should read --is light-transmissive--.

COLUMN 5:
    Line 11, "ultraviolet and/or" should read --ultraviolet rays and the light to be used in optical recording and/or--.
    Line 35, "than" should read --that--.

COLUMN 6:
    Line 6, "82m" should read --µm--.
    Line 28, "media" should read --medium--.

UNITED STATES PATENT AND TRADEMARK OFFICE
CERTIFICATE OF CORRECTION

PATENT NO. : 5,096,401  
DATED : March 17, 1992  
INVENTOR(S) : MIKI TAMURA, ET AL.

It is certified that error appears in the above-identified patent and that said Letters Patent is hereby corrected as shown below:

COLUMN 8:
- Line 28, "o" should read --of--.
- Line 52, "by" should be deleted.

COLUMN 9:
- Line 22, "Ltd." should read --Ltd.)--.
- Line 30, "he" should read --the--.

COLUMN 10:
- Line 8, "Width," should read --width--.

COLUMN 11:
- Line 63, "were" should be deleted.

COLUMN 12:
- Line 43, "form said" should read --from each--.
- Line 60, "claim 9" should read --claim 9,--.
- Line 61, "82m" should read --$\mu$m--.

Signed and Sealed this

Twentieth Day of July, 1993

MICHAEL K. KIRK

Attesting Officer     Acting Commissioner of Patents and Trademarks